(12) United States Patent
Wang et al.

(10) Patent No.: US 12,245,022 B2
(45) Date of Patent: Mar. 4, 2025

(54) SUBSCRIPTION RETRIEVAL FOR ANONYMOUS IDENTIFICATION

(71) Applicant: TELEFONAKTIEBOLAGET LM ERICSSON (PUBL), Stockholm (SE)

(72) Inventors: Cheng Wang, Shanghai (CN); David Castellanos ZAMORA, Madrid (ES); Helena Vahidi Mazinani, Lund (SE); Christine Jost, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 413 days.

(21) Appl. No.: 17/627,795

(22) PCT Filed: Jun. 25, 2021

(86) PCT No.: PCT/IB2021/055698
§ 371 (c)(1),
(2) Date: Jan. 17, 2022

(87) PCT Pub. No.: WO2021/260646
PCT Pub. Date: Dec. 30, 2021

(65) Prior Publication Data
US 2022/0279343 A1     Sep. 1, 2022

(30) Foreign Application Priority Data

Jun. 26, 2020   (WO) ................ PCT/CN2020/098322

(51) Int. Cl.
*H04W 12/02*     (2009.01)
*H04W 12/069*    (2021.01)
*H04W 12/72*     (2021.01)

(52) U.S. Cl.
CPC ......... *H04W 12/02* (2013.01); *H04W 12/069* (2021.01); *H04W 12/72* (2021.01)

(58) Field of Classification Search
CPC .... H04W 12/02; H04W 12/069; H04W 12/72
See application file for complete search history.

(56) References Cited

U.S. PATENT DOCUMENTS

2019/0364428 A1   11/2019   Torvinen et al.
2022/0007277 A1*   1/2022   Yu ........................ H04W 60/00
(Continued)

FOREIGN PATENT DOCUMENTS

EP         3525503 A1     8/2019
WO      2020099148 A1     5/2020

OTHER PUBLICATIONS

3GPP TS 33.501 v16.2.0, "3rd Generation Partnership Project; Technical Specification Group Services and System Aspects; Security architecture and procedures for 5G system (Release 16)", 3GPP TS 33.501 V16.2.0, Mar. 2020.
(Continued)

*Primary Examiner* — David J Pearson

(57) ABSTRACT

A first network node operating in a telecommunications network can receive an authentication request associated with a communication device requesting registration with the telecommunications network. The authentication request can include first subscriber information. The first network node can determine that the first subscriber information includes an anonymous identifier. Responsive to determining that the first subscriber information includes the anonymous identifier, the network node can determine an authentication procedure to be performed. The network node can receive information associated with the communication device as part of the authentication procedure. The network node can generate second subscriber information based on the information associated with the communication device.

28 Claims, 10 Drawing Sheets

(56) References Cited

U.S. PATENT DOCUMENTS

| | | | |
|---|---|---|---|
| 2022/0264300 A1* | 8/2022 | Nix | H04L 9/3265 |
| 2022/0295276 A1* | 9/2022 | Yang | H04L 9/3271 |
| 2023/0224704 A1* | 7/2023 | Atarius | H04W 12/12 |
| | | | 726/6 |
| 2023/0262455 A1* | 8/2023 | Salkintzis | H04L 63/08 |
| | | | 726/6 |
| 2023/0262463 A1* | 8/2023 | Kunz | H04L 63/1475 |
| | | | 455/410 |

OTHER PUBLICATIONS

Ericsson, "Anonymous SUCI for N5GC", 3GPP TSG-SA3 Meeting #100e, S3-201881, e-meeting, Aug. 17-28, 2020.

Ericsson, "Anonymous SUCI in EAP-TLS", 3GPP TSG-SA3 Meeting #100e, S3-201877, e-meeting, Aug. 17-28, 2020.

Ericsson, "Update to Annex B: ngKSI and ABBA", 3GPP TSG SA WG3 (Security) Meeting #91bis, S3-182008, La Jolla, USA, May 21-25, 2018.

Huawei et al., "Living CR for 5WWC", 3G{{ TSG-SA WG3 Meeting #98e, S3-200467, e-meeting, Mar. 2-6, 2020.

Simon et al., "The EAP-TLS Authentication Protocol", Network Working Group, Standards Track, RFC 5216, Microsoft Corporation, Mar. 2008.

* cited by examiner

US 12,245,022 B2

SUBSCRIPTION RETRIEVAL FOR ANONYMOUS IDENTIFICATION

PRIORITY CLAIM

This application is a national stage application of International Patent Application No. PCT/IB2021/055698, filed Jun. 25, 2021, which claims priority to International Patent Application No. PCT/CN2020/098322, filed Jun. 26, 2020, the disclosure disclosures of which are hereby incorporated in their entirety by reference.

TECHNICAL FIELD

The present disclosure relates generally to communications, and more particularly to communication methods and related devices and nodes supporting wireless communications.

BACKGROUND

FIG. 1 illustrates an example of a 5th Generation ("5G") network including a 5G base station ("gNB") and multiple communication devices 104 (also referred to as user equipment ("UE")).

The 3rd Generation Partnership Project ("3GPP") introduces the use of alternative authentication methods other than 5G authentication and key agreement ("AKA") or extensible authentication protocol authentication and key agreement ("EAP-AKA") (e.g., extensible authentication protocol transport layer security ("EAP-TLS")), for primary authentication and accessing the 5G system.

The alternative authentication methods can be used in private networks or with IoT devices in isolated deployment scenarios. Furthermore, as part of wireless and wireline convergence ("WWC") for the 5G system, it enables non-5G capable ("N5GC") devices (e.g., devices that lack 5G capabilities including non-access stratum ("NAS") and the derivation of 5G key hierarchy) that are behind a residential gateway in private or isolated scenarios with wireline access to make use of alternative EAP methods for authentication and accessing the 5G system.

SUMMARY

According to some embodiments, a method of operating a first network node in a telecommunications network is provided. The method can include receiving an authentication request associated with a communication device requesting registration with the telecommunications network. The authentication request can include first subscriber information. The method can further include determining that the first subscriber information includes an anonymous identifier. The method can further include, responsive to determining that the first subscriber information includes the anonymous identifier, determining an authentication procedure to be performed. The method can further include, responsive to determining the authentication procedure to be performed, receiving information associated with the communication device as part of the authentication procedure. The method can further include generating second subscriber information based on the information associated with the communication device.

According to other embodiments, a method of operating a second network node in a telecommunications network is provided. The method can include receiving, from a first network node, an authentication request associated with a communication device requesting registration with the telecommunications network. The authentication request can include first subscriber information. The method can further include, responsive to receiving the authentication request, determining that the first subscriber information includes an anonymous identifier. The method can further include, responsive to determining that the first subscriber information includes the anonymous identifier, determining an authentication procedure to be performed. The method can further include, responsive to determining the authentication procedure to be performed, transmitting an authentication response to the first network node. The authentication response can include an indicator indicating the authentication procedure and an indicator indicating that the subscriber information includes the anonymous identifier.

According to other embodiments, a first network node, a second network node, computer program, and/or computer program product is provided for performing the above methods.

In various embodiments described herein, in response to an anonymous SUCI being supplied during initial registration of a UE, a predetermined authentication procedure is chosen and triggered by the network. In some embodiments, an AUSF node generates a second SUCI or SUPI based on the information retrieved over the predetermined authentication procedure and retrieves the actual authentication subscription data and SUPI for the anonymous UE. Accordingly, subscription retrieval is available when and anonymous SUCI is sent over 5G system control signaling.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
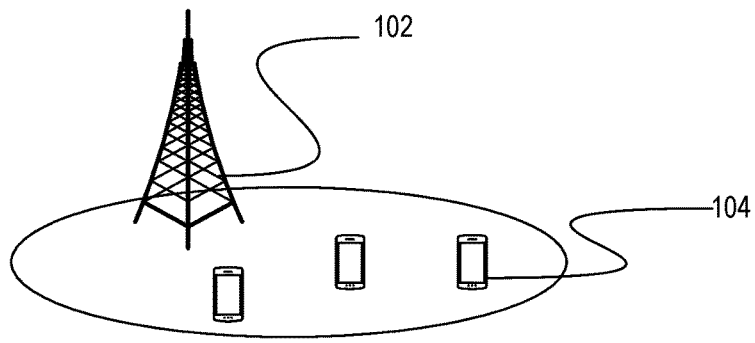
FIG. 1 is a schematic diagram illustrating an example of a 5th generation ("5G") network.
Figure 2:
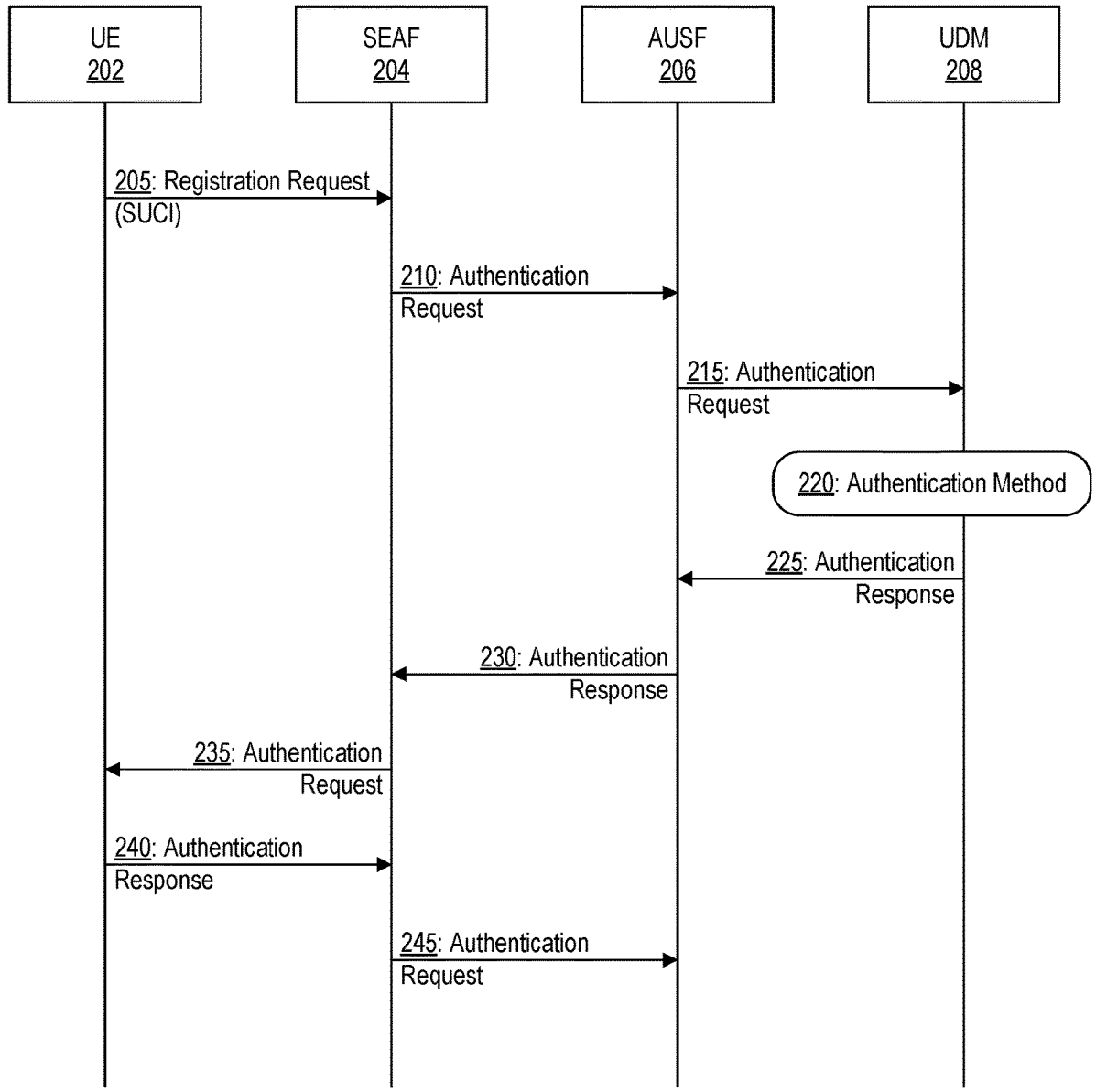
FIG. 2 is a signal flow diagram illustrating an example of using extensible authentication protocol transport layer security ("EAP-TLS") authentication procedures over 5G networks for initial authentication.
Figure 2:
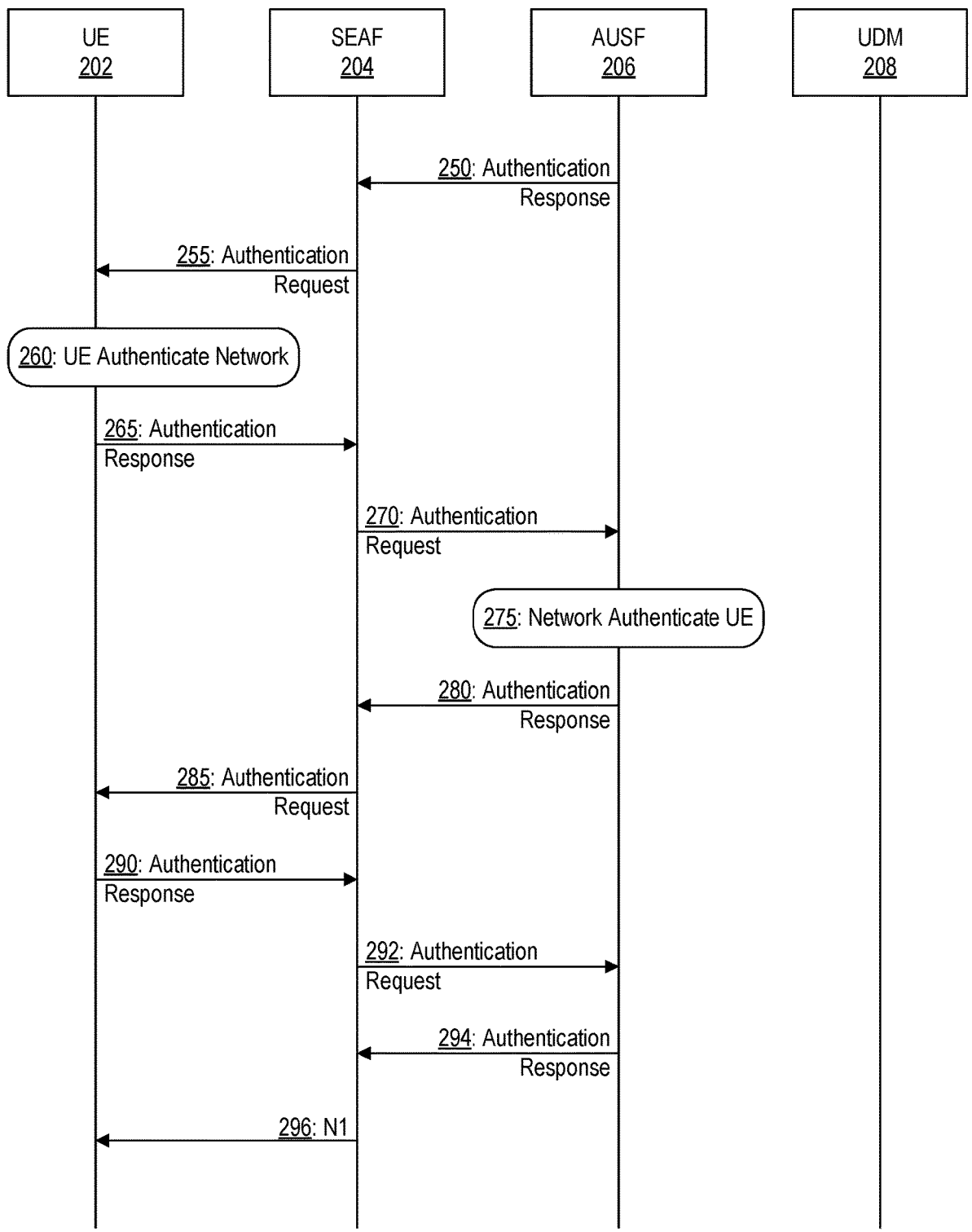

FIG. 2 illustrates an example of an alternative authentication process. In this example, an extensible authentication protocol transport layer security ("EAP-TLS") authentication procedure is illustrated for initial authentication with a 5G Network. Other EAP methods can be supported similarly.

In the 5G system, subscriber privacy is significantly improved, for example, by introducing a subscription concealed identifier ("SUCI"), which is expected to be used in initial access to the 5G system. SUCI protects subscription permanent identifier ("SUPI") (e.g., prevents SUPI from being exposed over-the-air). The SUCI includes the concealed SUPI by encrypting the SUPI using a public key (e.g., a home network public key) and a protection scheme that was securely provisioned in the universal subscriber identity module ("USIM") in control of the home network.

Blocks 205, 210, 215, and 220 can be part of an initial registration process of the UE 202 with a network including the SEAF 204, AUSF 206, and UDM 208. At block 205, a UE 202 transmits a registration request including a SUCI to a SEAF 204. At block 210, the SEAF 204 transmits an authentication request (e.g., Nausf_UEAuthentication_AuthenticateRequest (SUCI, SN-name)) to an AUSF 206. At block 215, the AUSF 206 transmits an authentication request (e.g., Nudm_UEAuthenticate_Get Request (SUCI, SN name) to a UDM 208. At block 220, the UDM 208 performs an authentication method selection. In this example, the UDM 208 selects an EAP-TLS process for authenticating the UE 202.

At block 225, the UDM 208 transmits an authentication response (e.g., Nudm_UEAuthentication_GetResponse (SUPI, Indicator (EAP-TLS))) to the AUSF 206.

Blocks 230, 235, 240, 245, 250, 255, 260, 265, 270, 275, 280, 285, 290, 292, 294, and 296 illustrate an example of an EAP-TLS authentication procedure. At block 230, the AUSF 206 transmits an authentication response (e.g., Nausf_UEAuthentication_AuthenticateResponse (EAP Request/ EAP-Type=EAP-TLS (TLS Start))) to the SEAF 204. At block 235, the SEAF 204 transmits an authentication request (e.g., Auth-Req. (EAP Request/EAP-Type=EAP-TLS (TLS Start), ngKSI, ABBA)) to the UE 202. At block 240, the UE 202 transmits an authentication response (e.g., Auth-Resp. (EAP Response/EAP-Type=EAP-TLS (TLS client_hello))) to the SEAF 204. At block 245, the SEAF 204 transmits an authentication request (e.g., Nausf_UEAuthentication_AuthenticateRequest (EAP Response/EAP-Type=EAP-TLS (TLS client_hello))) to the AUSF 206. At block 250, the AUSF 206 transmits an authentication response (e.g., Nausf_UEAuthentication_AuthenticateResponse (EAP Request/ EAP-Type=EAP-TLS (TLS server_hello, TLS certificate, TLS server_key_exchange, TLS certificate_request, TLS server_hello_done))) to the SEAF 204. At block 255, the SEAF 204 transmits an authentication request (e.g., Auth-Req. (EAP Request/EAP-Type=EAP-TLS (TLS server_ hello, TLS certificate, TLS server_key_exchange, TLS certificate_request, TLS server_hello_done), ngKSI, ABBA)) to the UE 202. At block 260, the UE 202 authenticates the network.

At block 265, the UE 202 transmits an authentication response (e.g., Auth-Resp. (EAP Request/EAP-Type=EAP-TLS (TLS certificate, TLS client_key_exchange, TLS certificate_verify, TLS change_cipher_spec, TLS finished))) to the SEAF 204. At block 270, the SEAF 204 forwards the authentication request (e.g., Nausf_UEAuthentication_AuthenticateRequest (EAP Request/EAP-Type=EAP-TLS (TLS certificate, TLS client_key_exchange, TLS certificate_verify, TLS change_cipher_spec, TLS finished))) to the AUSF 206. At block 275, the AUSF 206 authenticates the UE.

At block 280, the AUSF 206 transmits an authentication response (e.g., Nausf_UEAuthentication_AuthenticateResponse (EAP Request/EAP-Type=EAP-TLS (TLS change_ cipher_spec, TLS finished))) to the SEAF 204. At block 285, the SEAF 204 transmits an authentication request (e.g., Auth-Req. (EAP Request/EAP Type=EAP-TLS (TLS change_cipher_spec, TLS finished), ngKSI, ABBA)) to the UE 202. At block 290, the UE 202 transmits an authentication response (e.g., Auth-Resp. (EAP Response/EAP-Type=EAP-TLS)) to the SEAF 204. At block 292, the SEAF 204 transmits the authentication request (e.g., Nausf_UEAuthentication_AuthenticateRequest (EAP Response/EAP-Type=EAP-TLS)) to the AUSF 206. At block 294, the AUSF 206 transmits the authentication response (e.g., Nausf_UEAuthentication_AuthenticateResponse (EAP Success, AnchorKey, SUPI) to the SEAF 204. At block 296, the SEAF 204 transmits an N1 message (e.g., N1 (EAP success, ngKSI, ABBA) to the UE 202.

A "Null-scheme" is a dummy scheme that does not conceal SUPI and instead provides SUPI in cleartext. By using "null-scheme", devices or UEs equipped with legacy USIM, that do not have capability to conceal SUPI, can also access 5G system but without the ability to hide the SUPI.

Beside the subscribe privacy feature provided by 5G system, some authentication methods can support inherent identifier privacy mechanism. For example, for EAP TLS, subscription identifier privacy is supported inherently in TLS 1.3 or via separate privacy option in TLS 1.2.

Subscription identifier protection needs to be taken care of in both 5G system control signaling and EAP transaction (e.g. blocks 205 and 265 in FIG. 2). When EAP TLS is used as alternative authentication method and "null scheme" is used in 5G system control signaling (e.g., over NAS), subscription identifier privacy could be ineffective as SUCI with "null scheme" would disclose SUPI in clear text even though EAP TLS may provide its own privacy protection.

Thereby, it is recommended in 3GPP, that the "null-scheme" could be used while still preserving subscription identifier privacy, by omitting the username part from network access identifier ("NAI") of SUPI or setting username as "anonymous." It would be analogous to using anonymous identifier in EAP, meaning that only realm part from NAI is included in SUCI. A SUCI built in this way can be referred to as an anonymous SUCI.

However, one essential step in primary authentication procedure is that an authentication server function ("AUSF") node can fetch UE's authentication subscription data and de-concealed SUPI from a unified data management ("UDM") node, based on SUCI. By using anonymous SUCI (e.g., SUCI without username or username as "anonymous"), it may not be feasible for the UDM to locate UE's subscription or provide proper SUPI back to the AUSF. This can lead to the authentication procedure failing.

Various embodiments described herein provide an AUSF node that can map the information conveyed over EAP TLS (e.g., user's certificate or UE's ID sending over TLS tunnel such as from EAP tunneled transport layer security ("TTLS")), to a second SUCI or SUPI. The AUSF can then use the second SUCI or SUPI to fetch the UE's authentication subscription data and/or genuine SUPI from the UDM.

In some embodiments, mapping the information conveyed over EAP TLS to a second SUCI or SUPI can enables subscription retrieval when an anonymous SUCI is sent over 5G system control signaling.

Figure 5:
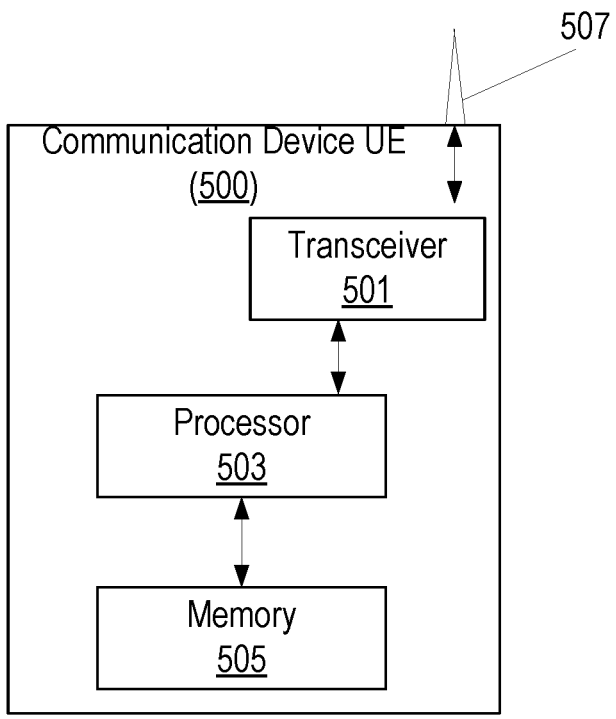
FIG. 5 is a block diagram illustrating an example of a communication device in accordance with some embodiments.

FIG. 5 is a block diagram illustrating elements of a communication device 500 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 500 may be provided,) As shown, communication device 500 may include an antenna 507, and transceiver circuitry 501 (also referred to as a transceiver) including a transmitter and a receiver configured to provide uplink and downlink radio communications with a base station(s) (also referred to as a RAN node) of a radio access network. Communication device 500 may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Communication device 500 may also include an interface (such as a user interface) coupled with processing circuitry 503, and/or communication device UE may be incorporated in a vehicle.

As discussed herein, operations of communication device 500 may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations.

Figure 6:
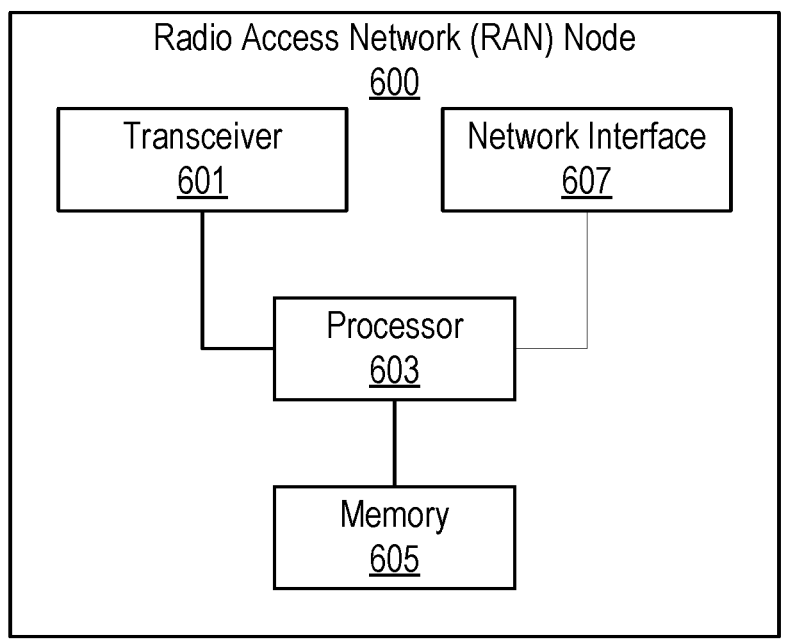
FIG. 6 is a block diagram illustrating an example of a radio access network ("RAN") node in accordance with some embodiments.

FIG. 6 is a block diagram illustrating elements of a radio access network ("RAN") node 600 (also referred to as a network node, base station, eNodeB/eNB, gNodeB/gNB, etc.) of a Radio Access Network (RAN) configured to provide cellular communication according to embodiments of inventive concepts. (RAN node 600 may be provided) As shown, the RAN node 600 may include transceiver circuitry 601 (also referred to as a transceiver) including a transmitter and a receiver configured to provide uplink and downlink radio communications with mobile terminals. The RAN node 600 may include network interface circuitry 607 (also referred to as a network interface) configured to provide communications with other nodes (e.g., with other base stations) of the RAN and/or core network CN. The RAN node 600 may also include processing circuitry 603 (also referred to as a processor) coupled to the transceiver circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node 600 may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to network nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 7:
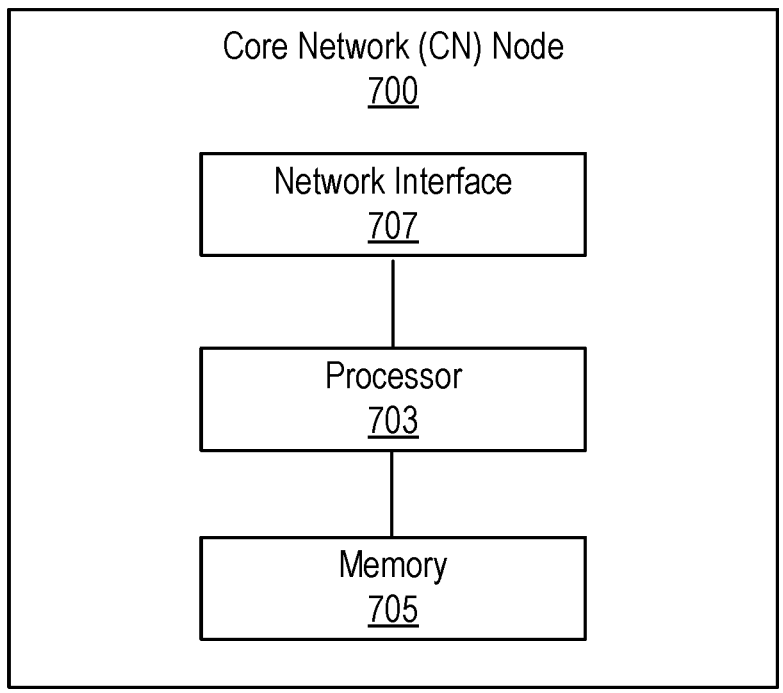
FIG. 7 is a block diagram illustrating an example of a core network ("ON") node in accordance with some embodiments.

FIG. 7 is a block diagram illustrating elements of a core network ("CN") node 700 (e.g., an SMF node, an AMF node, an AUSF node, a UDM node, etc.) of a communication network configured to provide cellular communication according to embodiments of inventive concepts. As shown, the CN node 700 may include network interface circuitry 707 (also referred to as a network interface) configured to provide communications with other nodes of the core network and/or the RAN. The CN node 700 may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CN node 700 may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations.

Figure 8:
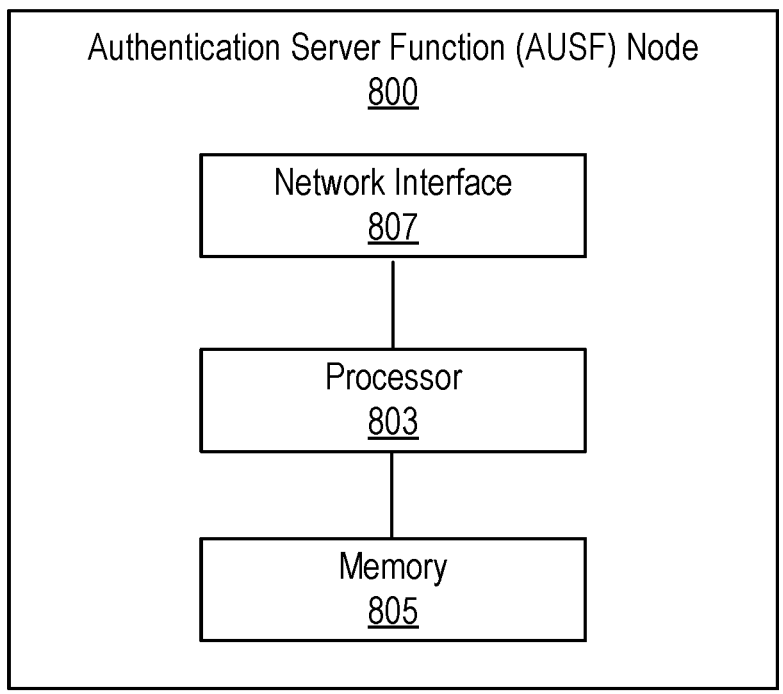
FIG. 8 is a block diagram illustrating an example of an authentication server function ("AUSF") node in accordance with some embodiments.

FIG. 8 is a block diagram illustrating elements of an authentication server function ("AUSF") node 800 of a communication network configured to provide cellular communication according to embodiments of inventive concepts. As shown, the AUSF node 800 may include network interface circuitry 807 (also referred to as a network interface) configured to provide communications with other nodes of the core network and/or the RAN. The AUSF node 800 may also include a processing circuitry 803 (also referred to as a processor) coupled to the network interface circuitry, and memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the AUSF node 800 may be performed by processing circuitry 803 and/or network interface circuitry 807. For example, processing circuitry 803 may control network interface circuitry 807 to transmit communications through network interface circuitry 807 to one or more other network nodes and/or to receive communications through network interface circuitry from one or more other network nodes. Moreover, modules may be stored in memory 805, and these modules may provide instructions so that when instructions of a module are executed by processing circuitry 803, processing circuitry 803 performs respective operations.

Figure 9:
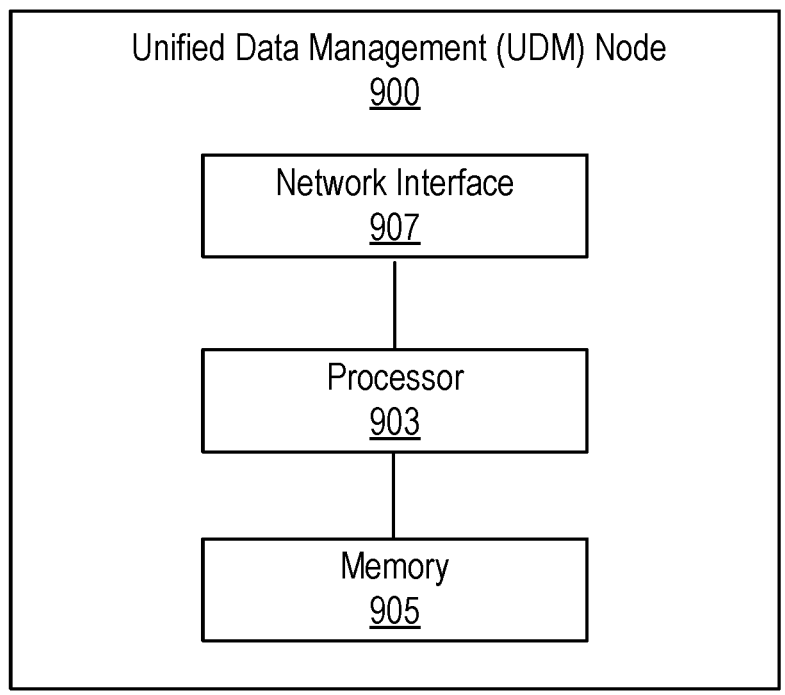
FIG. 9 is a block diagram illustrating an example of a unified data management ("UDM") node in accordance with some embodiments.

FIG. 9 is a block diagram illustrating elements of a unified data management ("UDM") node 900 of a communication network configured to provide cellular communication according to embodiments of inventive concepts. As shown, the UDM node 900 may include network interface circuitry 907 (also referred to as a network interface) configured to provide communications with other nodes of the core network and/or the RAN. The UDM node 900 may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the UDM node 900 may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations.

Although FIGS. 8-9 illustrate an independent AUSF node 800 and UDM node 900, in some embodiments a CN node can include an AUSF layer and a UDM layer that share one or more components including processing circuitry, memory, and a network interface.

Figure 3:
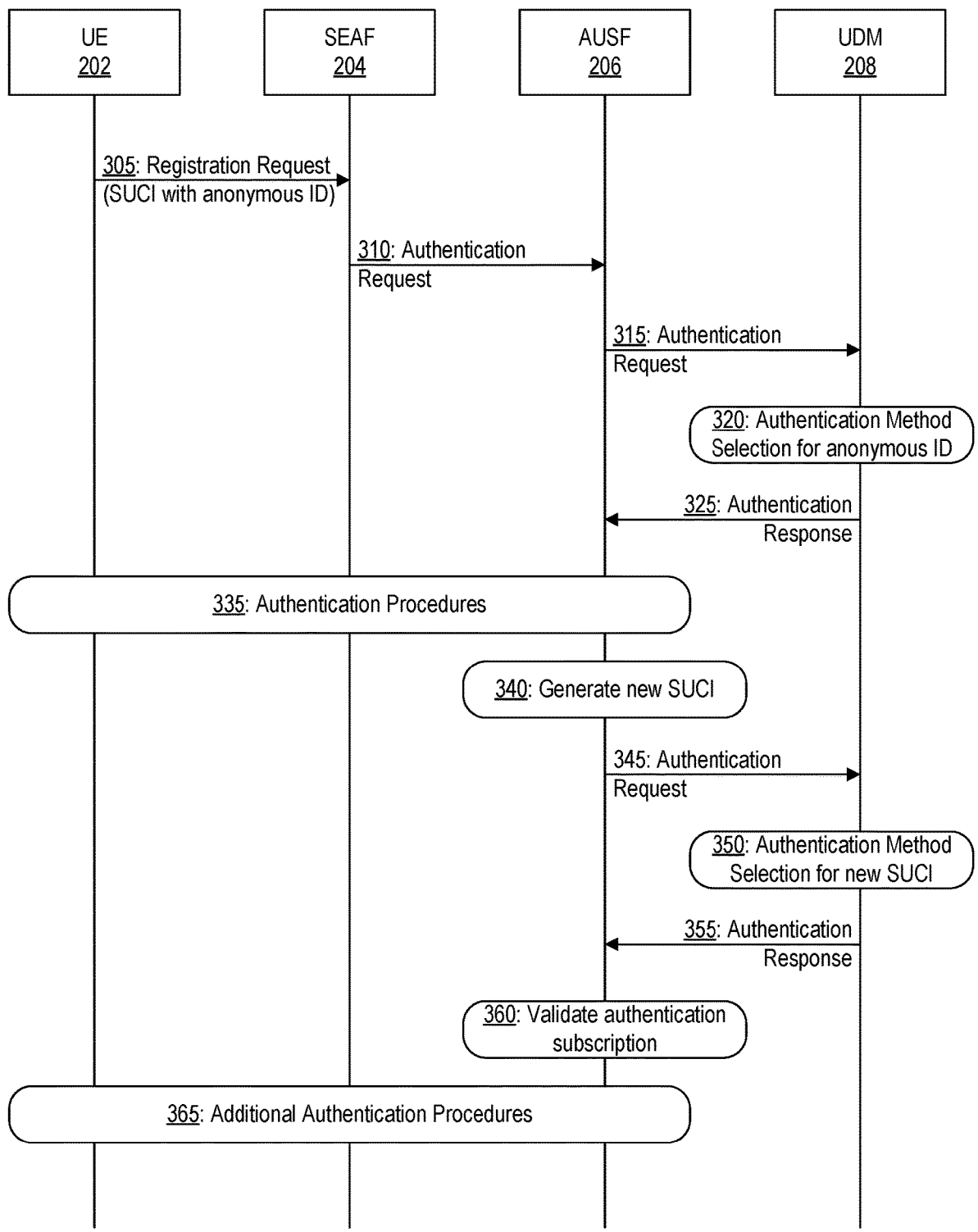
FIG. 3 is a signal flow diagram illustrating an example of subscription retrieval for an anonymous identification ("ID") in accordance with some embodiments.
Figure 4:
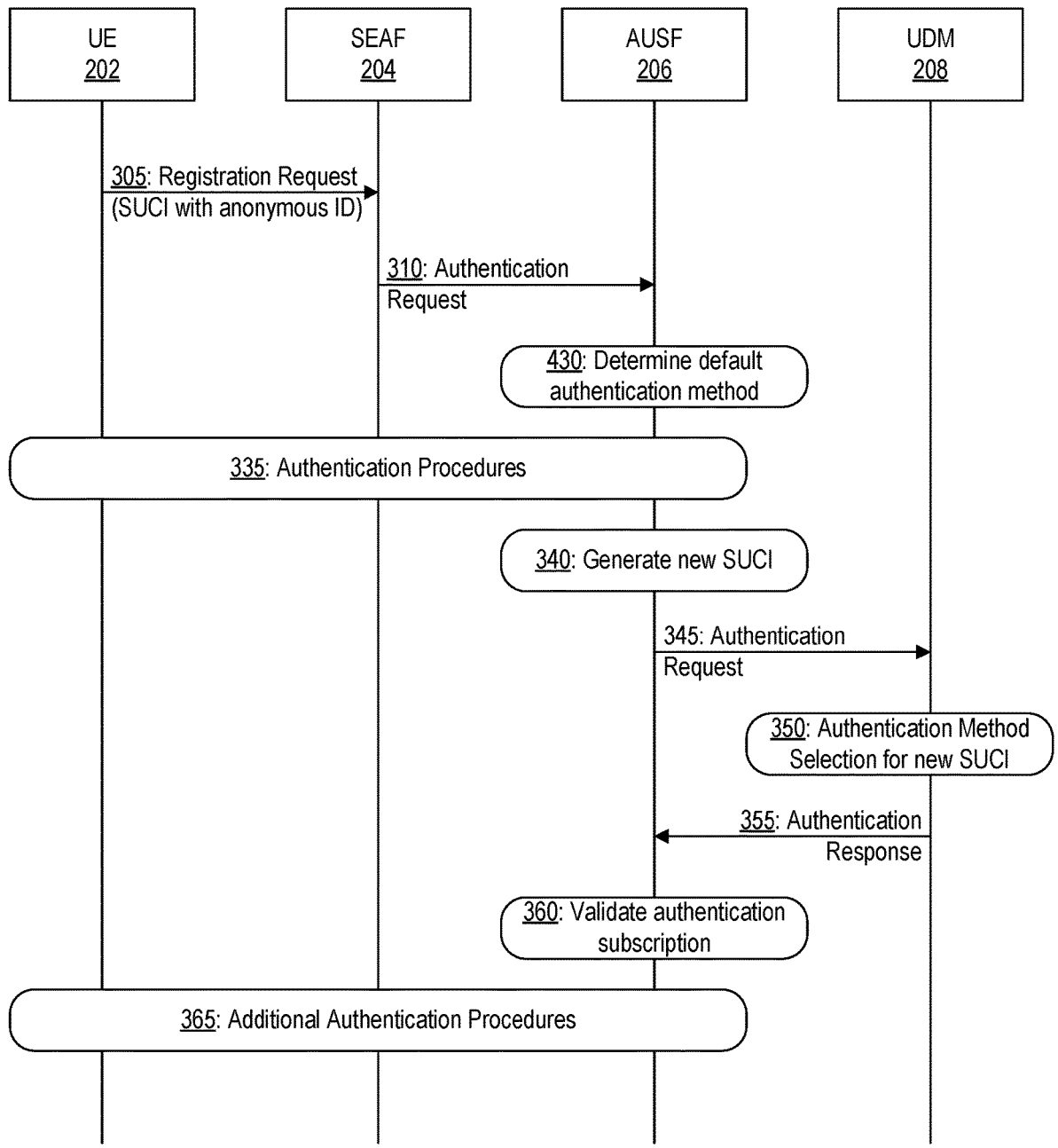
FIG. 4 is a signal flow diagram illustrating another example of subscription retrieval for an anonymous identification ("ID") in accordance with some embodiments.

FIGS. 3-4 illustrate two different processes for subscription retrieval for anonymous ID. Both FIGS. 3-4 include blocks 305, 310, 335, 340, 345, 350, 355, 360, and 365. FIG. 3 includes block 315, 320, and 325 that illustrate a process in which the AUSF 206 transmits the SUCI to the UDM 208 (e.g., UDM node 900), which determines that the SUCI includes an anonymous ID, generates a dummy SUPI, and transmits the dummy SUPI to the AUSF 206. FIG. 4 includes block 430 that illustrates a process in which the AUSF 206 (e.g., AUSF node 800 in FIG. 8) determines that the SUCI includes an anonymous ID.

At block 305, the UE 202 triggers an initial registration procedure towards the 5G system and sends anonymous SUCI as a subscriber identifier. The UE 202 can be a 3GPP UE or a NSGC. If the UE 202 is a NSGC, the authentication request may reach the SEAF 204 via intermediate nodes such as a residential gateway ("RG") and a wireline access gateway function ("W-AGF") from a wireline access network. In some examples, the anonymous SUCI can be generated by the W-AGF on behalf of the N5GC.

At block 310, the SEAF 204 (or an authentication management function ("AMF") node) selects the AUSF 206 based on the home network identifier of the SUCI in the received registration request and sends an authentication request message (e.g., a Nausf_UEAuthentication_Authenticate Request message) to the AUSF 206 to trigger an authentication procedure. In some examples, if the UE is a N5GC the authentication request message may also include an indicator that the request is on behalf of a N5GC device.

At block 315, the AUSF 206 sends an authentication request (e.g., a Nudm_UEAuthentication_Get Request) to the UDM 208 to request authentication subscription data and the de-concealed SUPI for the UE 202. The authentication request can include the anonymous SUCI of the N5GC device or 3GPP UE.

At block 320, the UDM 208 invokes the subscriber identity de-concealing function ("SIDF") to map the anonymous SUCI to the SUPI and determine it is an anonymous SUCI. The UDM 208 generates a dummy SUPI and selects a default authentication method for the dummy SUPI (e.g., EAP-TLS).

At block 325, the UDM 208 transmits an authentication response (e.g., a Nudm_UEAuthentication_Get Response) to the AUSF 206, which includes the dummy SUPI and/or an indicator of a dummy authentication subscription.

Instead of blocks 315, 320, and 325, FIG. 4 includes block 430. At block 430, the AUSF 206 determines by itself the received SUCI is an anonymous SUCI, based on the information received from the SEAF 204 in block 310. For example, the AUSF 206 may detect a N5GC indicator in the information received from the SEAF 204. In some embodiments, a process may include some of blocks 315, 320, 325, and 430 such that the AUSF 206 determines that the received SUCI is an anonymous SUCI based on information received from the UDM 208. For example, the AUSF 206 may receive an error code in block 325 from the UDM 208. The AUSF 206 can then select a default authentication method for anonymous SUCI (e.g., EAP-TLS) based on mobile network operators ("MNO") policy.

At block 335, an authentication procedure proceeds (e.g., an EAP TLS flow as illustrated in FIG. 2).

At block 340, once the AUSF 206 receives UE identifier information (e.g., a client certificate or an identifier sent over TLS tunnel), the AUSF 206 generates a 3GPP identifier based on the UE identifier information used during the EAP authentication method. Depending on whether the UE identifier information is a 3GPP permanent identifier (e.g., a SUPI) or an identifier which could serve as a pseudonym ID to 3GPP subscription, the AUSF builds a 2nd SUCI using null-Scheme or a SUPI. For example, the 2nd SUCI or the SUPI can include an identity that is part of, or mapped from a client certificate or a username sent over TLS tunnel.

At block 345, the AUSF 206 transmits an authentication request (e.g., a Nudm_UEAuthentication_Get Request) to the UDM 208 to request authentication subscription data and/or the de-concealed SUPI for the UE 202. The authentication request includes the 2nd SUCI or a SUPI, and optionally an indicator that one default authentication method (e.g. EAP TLS) has been performed for the UE 202.

At block 350, if the 2nd SUCI is received, the UDM 208 invokes the SIDF to map the 2nd SUCI to the SUPI. The UDM 208 then selects an authentication method (e.g., EAP-TLS) based on the subscription data corresponding to the SUPI (mapped from the 2nd SUCI or received from AUSF 206). The UDM 208 may select the actual authentication method for the SUPI, considering the indicator that one default authentication method (e.g. EAP TLS) has been performed for the UE 202.

At block 355, the UDM 208 transmits an authentication response (e.g., a Nudm_UEAuthentication_Get Response) to the AUSF 206, which includes the SUPI and an indicator of the selected authentication method (e.g., EAP-TLS).

At block 360, the AUSF 206 validates the information received from the UDM 208 and the actual selected authentication method by the UDM 208 match with the one performed in earlier operations.

If a different authentication method is selected by the UDM 208, the AUSF 206 may close the existing authentication transaction and trigger a new authentication procedure based on the actual selected authentication method. Otherwise, at block 365, the rest of the authentication procedure proceeds (e.g., the rest of the EAP TLS flow illustrated in FIG. 2). In some examples, the AUSF 206 transmits the authentication result and/or the actual SUPI back to SEAF 204.

Figure 10:
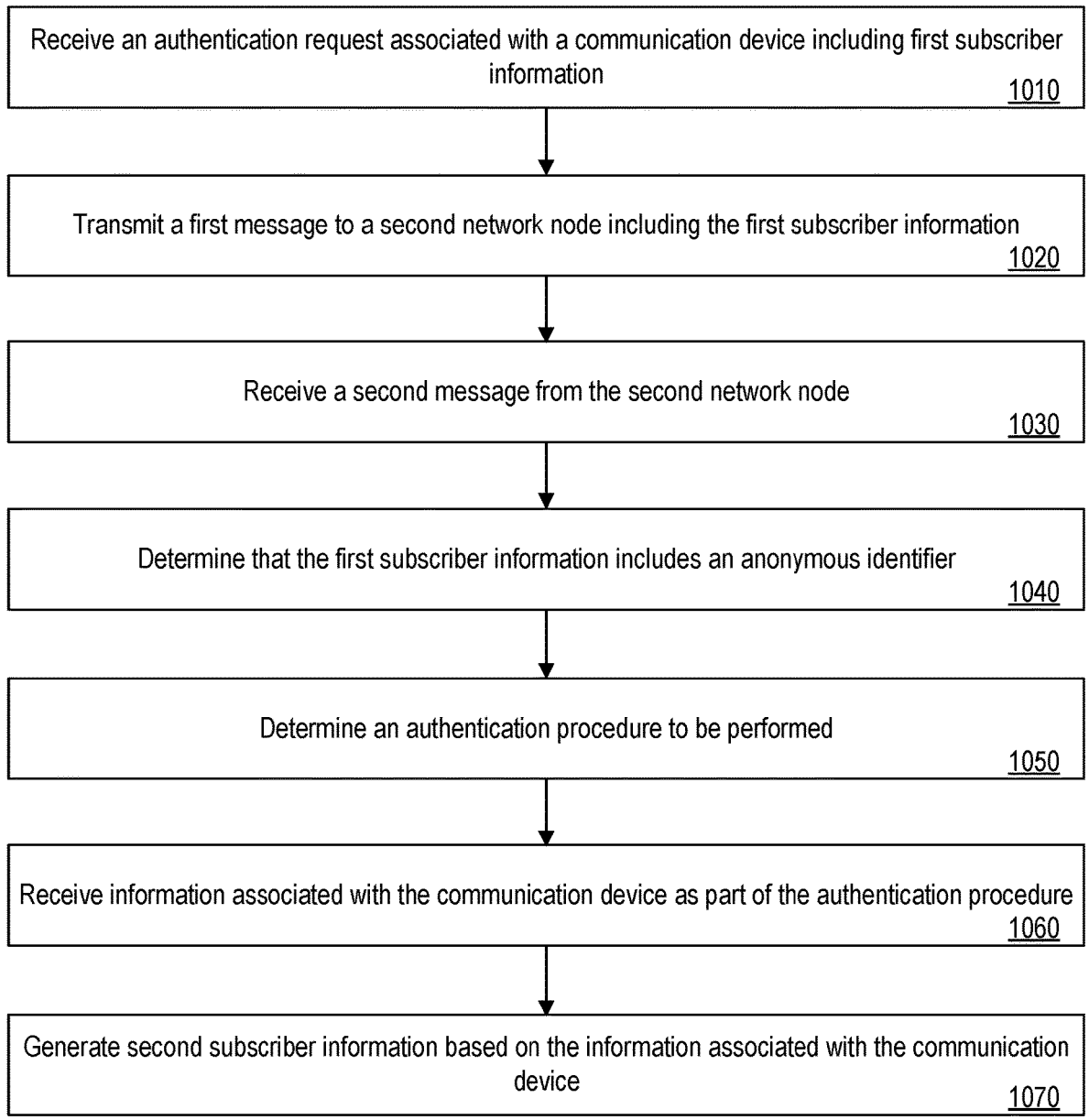
FIGS. 10-11 are flow charts illustrating examples of processes performed by a first network node (e.g., a AUSF node) in accordance with some embodiments.
Figure 11:
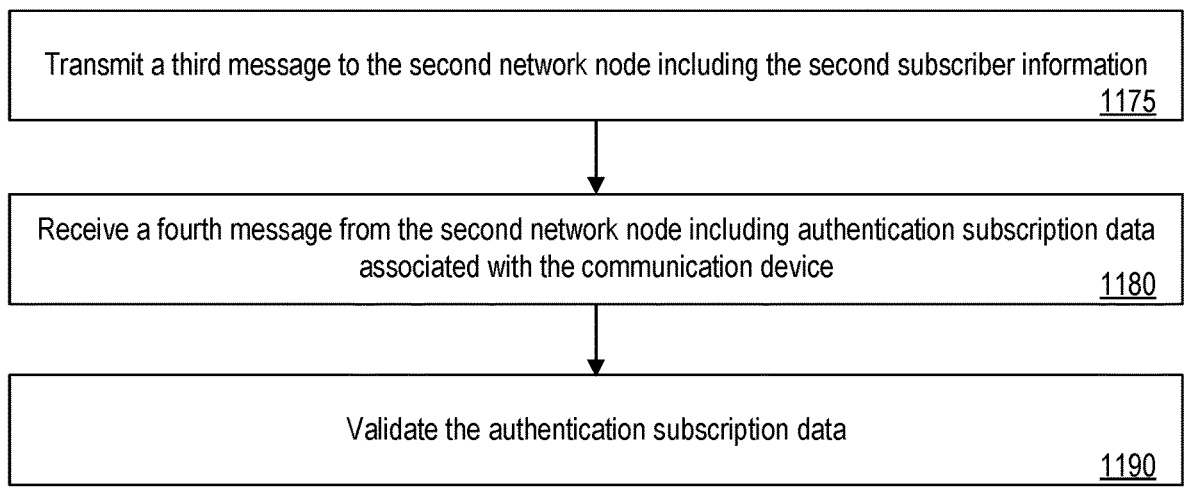

Operations of a AUSF node will now be discussed with reference to the flow chart of FIGS. 10-11 according to some embodiments of inventive concepts. FIGS. 10-11 will be described below as being performed by AUSF node 800 (implemented using the structure of the block diagram of FIG. 8). For example, modules may be stored in memory 805 of FIG. 8, and these modules may provide instructions so that when the instructions of a module are executed by respective AUSF processing circuitry 803, processing circuitry 803 performs respective operations of the flow charts. However, the operations in FIGS. 10-11 may be performed by any suitable network node.

FIG. 10 illustrates an example of a process performed by a first network node to generate second subscriber information (without an anonymous identifier) when first subscriber information includes an anonymous identifier.

At block 1010, processing circuitry 803 receives, via network interface 807, an authentication request associated with a communication device including first subscriber information. In some embodiments, the authentication request is part of a request by the communication device to register with the telecommunications network, which is a 5G network. In additional or alternative embodiments, the first subscriber information includes a subscription concealed identifier, SUCI. In additional or alternative embodiments, the authentication request further includes an indicator indicating that the communication device is a NSGC device.

At block 1020, processing circuitry 803 transmits, via network interface 807, a first message to a second network node including the first subscriber information. In some embodiments, the second network node is a UDM node (e.g., UDM node 900 in FIG. 9).

At block 1030, processing circuitry 803 receives, via network interface 807, a second message from the second network node. In some embodiments, the second message includes an indicator indicating that the first subscriber information includes an anonymous identifier. In additional or alternative embodiments, the second message includes an indicator indicating an authentication procedure to be performed.

At block 1040, processing circuitry 803 determines that the first subscriber information includes an anonymous identifier. In some embodiments, processing circuitry 803 determines that the first subscriber information includes an anonymous identifier based on an indicator in the second message. In additional or alternative embodiments, processing circuitry 803 determines that the first subscriber information includes the anonymous identifier based on the authentication request including an indicator indicating that the communication device is a N5GC device.

At block 1050, processing circuitry 803 determines an authentication procedure to be performed. In some embodiments, the authentication procedure is a predetermined or default authentication procedure that is selected in response to the first subscriber information including an anonymous identifier. In additional or alternative embodiments, the authentication procedure includes a EAP-TLS.

At block 1060, processing circuitry 803 receives, via network interface 807, information associated with the communication device as part of the authentication procedure.

At block 1070, processing circuitry 803 generates second subscriber information based on the information associated with the communication device. In some embodiments, the second subscriber information includes a SUCI or a SUPI.

FIG. 11 illustrates an example of an additional process performed by a first network node to validate authentication subscription data associated with the second subscriber information.

At block 1175, processing circuitry 803 transmits, via network interface 807, a third message to the second network node including the second subscriber information.

At block 1180, processing circuitry 803 receives, via network interface 807, a fourth message from the second network node including authentication subscription data associated with the communication device.

At block 1190, processing circuitry 803 validates the authentication subscription data. In some embodiments, the fourth message includes a second authentication procedure associated with the authentication subscription data. If the second authentication procedure is different than the predetermined/default authentication procedure, the processing circuitry 803 may perform the second authentication procedure and regenerate the second subscriber information based on information received as part of the second authentication procedure. In additional or alternative embodiments, validating the authentication subscription data can include determining that third subscriber information associated with the authentication subscription data matches the second subscriber information.

Various operations of FIGS. 10-11 may be optional with respect to some embodiments of communication devices and related methods. Regarding the method of Example Embodiment 1 below, for example, operations of blocks 1020, 1030, 1050, and 1060 of FIG. 10 and blocks 1175, 1180, and 1190 of FIG. 11 may be optional.

Figure 12:
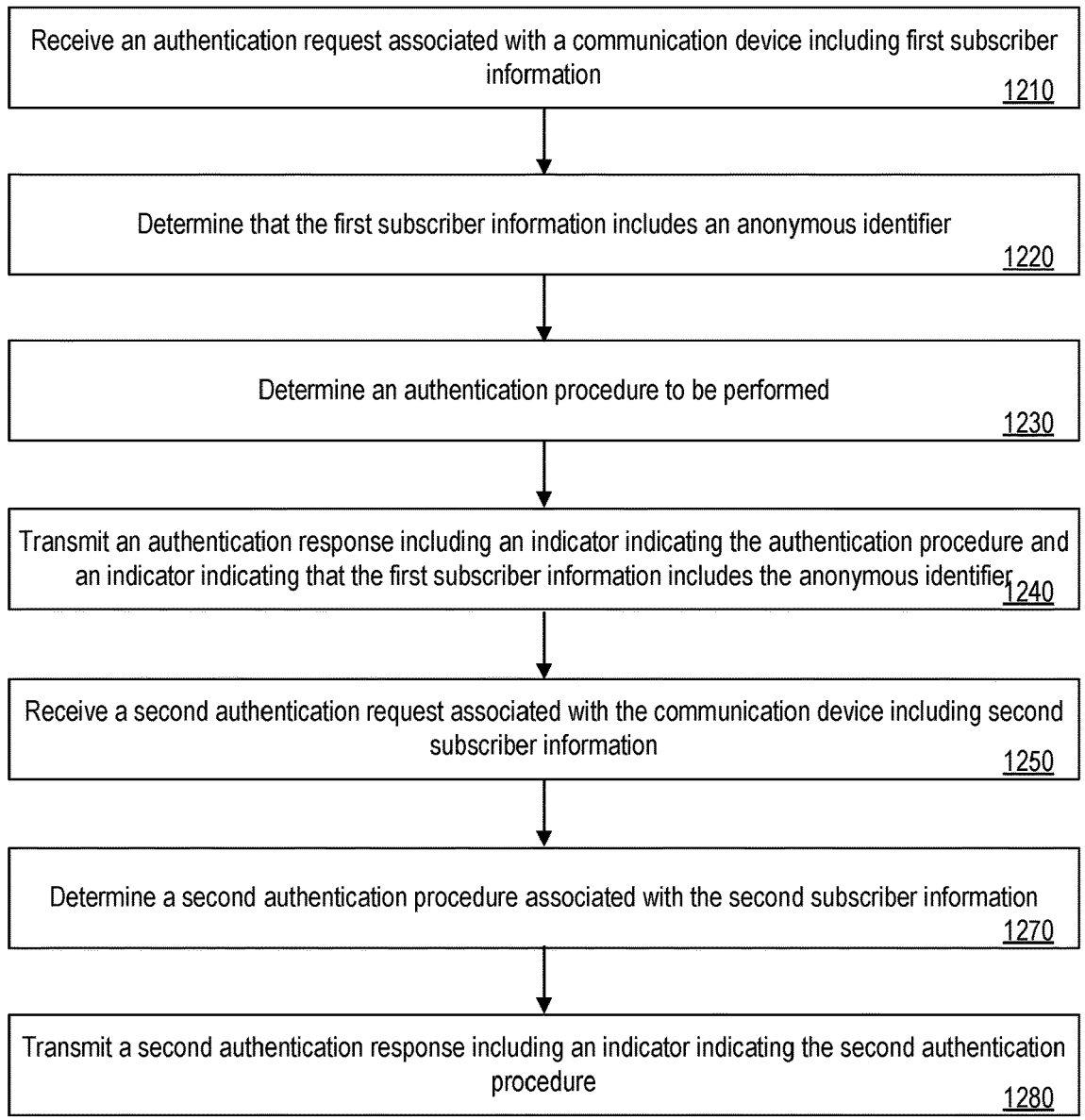
FIGS. 12-13 are flow charts illustrating examples of processes performed by a second network node (e.g., a UDM node) in accordance with some embodiments.
Figure 13:
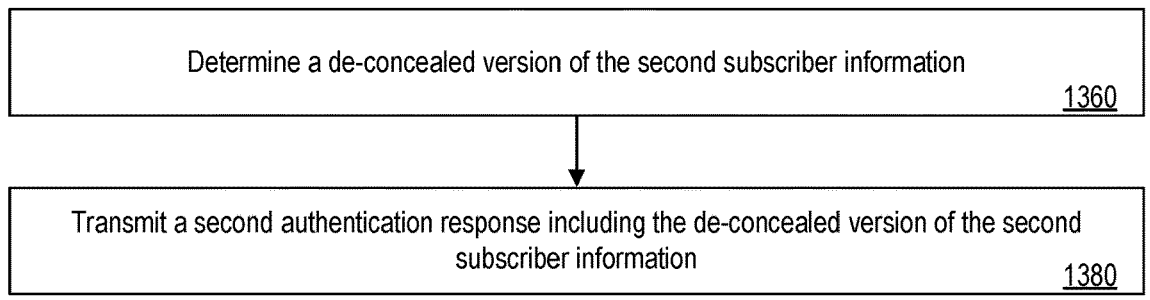

Operations of a UDM node will now be discussed with reference to the flow chart of FIGS. 12-13 according to some embodiments of inventive concepts. FIGS. 12-13 will be described below as being performed by UDM node 900 (implemented using the structure of the block diagram of FIG. 9). For example, modules may be stored in memory 905 of FIG. 9, and these modules may provide instructions so that when the instructions of a module are executed by respective UDM processing circuitry 903, processing circuitry 903 performs respective operations of the flow charts. However, the operations in FIGS. 12-13 may be performed by any suitable network node.

FIG. 12 illustrates an example of a process performed by a second network node to obtain and validate second subscriber information (without an anonymous identifier) when first subscriber information includes an anonymous identifier.

At block 1210, processing circuitry 903 receives, via network interface 907, an authentication request associated with a communication device including first subscriber information. In some embodiments, the authentication request is part of a request by the communication device to register with the telecommunications network, which is a 5G network. In additional or alternative embodiments, the first subscriber information includes a subscription concealed identifier, SUCI. In additional or alternative embodiments, the authentication request further includes an indicator indicating that the communication device is a N5GC device.

At block 1220, processing circuitry 903 determines that the first subscriber information includes an anonymous identifier. In some embodiments, determining that the first subscriber information includes an anonymous identifier includes attempting to de-conceal the first subscriber information. In additional or alternative embodiments, determining that the first subscriber information includes an anonymous identifier includes detecting the indicator indicating that the communication device is a N5GC device.

At block 1230, processing circuitry 903 determines an authentication procedure to be performed. In some embodiments, the authentication procedure is a predetermined or default authentication procedure that is selected in response to the first subscriber information including an anonymous identifier. In additional or alternative embodiments, the authentication procedure includes a EAP-TLS.

At block 1240, processing circuitry 903 transmits, via network interface 907, an authentication response including an indicator indicating the authentication procedure and an indicator indicating that the first subscriber information includes the anonymous identifier. In some embodiments, the indicator indicating that the first subscriber information includes the anonymous identifier can include dummy subscriber information.

At block 1250, processing circuitry 903 receives, via network interface 907, a second authentication request associated with the communication device including second subscriber information. In some embodiments, the second authentication request can further include an indicator indicating that the authentication procedure has been performed.

At block 1270, processing circuitry 903 determines a second authentication procedure associated with the second subscriber information.

At block 1280, processing circuitry 903 transmits, via network interface 907, a second authentication response including an indicator indicating the second authentication procedure.

FIG. 13 illustrates an example of additional operations performed by the second network node in response to the second subscriber information including a concealed identifier (e.g., a SUCI). At block 1360, processing circuitry 903 determines a de-concealed version of the second subscriber information, for example, a SUPI. At block 1380, processing circuitry 903 transmits, via network interface 907, the second authentication response including the de-concealed version of the second subscriber information.

Various operations of FIGS. 12-13 may be optional with respect to some embodiments of communication devices and related methods. Regarding the method of Example Embodiment 9 below, for example, operations of blocks 1250, 1270, and 1280 of FIG. 12 and blocks 1360 and 1380 of FIG. 13 may be optional.

Example Embodiments are included below.

Embodiment 1. A method of operating a first network node in a telecommunications network, the method comprising:

receiving (1010) an authentication request associated with a communication device requesting registration with the telecommunications network, the authentication request including first subscriber information;

determining (1040) that the first subscriber information includes an anonymous identifier;

responsive to determining that the first subscriber information includes the anonymous identifier, determining (1050) an authentication procedure to be performed;

responsive to determining the authentication procedure to be performed, receiving (1060) information associated with the communication device as part of the authentication procedure; and generating (1070) second subscriber information based on the information associated with the communication device.

Embodiment 2. The method of Embodiment 1, wherein the first network node is an authentication server function, AUSF, node, and wherein the telecommunications network is a 5th generation, 5G, network.

Embodiment 3. The method of any of Embodiments 1-2, wherein the first subscriber information comprises a first subscription concealed identifier, SUCI, wherein the second subscriber information comprises a second SUCI or a subscription permanent identifier, SUPI.

Embodiment 4. The method of any of Embodiments 1-3, wherein the authentication request further includes an indicator indicating that the communication device is a non-5G capable, N5GC, device, and wherein determining that the first subscriber information includes the anonymous identifier comprises determining that the first subscriber information includes the anonymous identifier based on the authentication request including the indicator indicating that the communication device is a N5GC device.

Embodiment 5. The method of any of Embodiments 1-4, further comprising:
- responsive to receiving the authentication request, transmitting (1020) a first message to a second network node, the first message including the first subscriber information; and
- responsive to transmitting the first message to the second network node, receiving (1030) a second message from the second network node, the second message including a first indicator indicating that the first subscriber information includes the anonymous identifier and a second indicator indicating the authentication, and
- wherein determining that the first subscriber information includes the anonymous identifier comprises determining that the first subscriber information includes the anonymous identifier based on the first indicator, and
- wherein determining the authentication procedure to be performed comprises determining the authentication procedure to be performed based on the second indicator.

Embodiment 6. The method of any of Embodiments 1-5, further comprising:
- responsive to generating the second subscriber information, transmitting (1175) a third message to a second network node, the third message including the second subscriber information and an indicator indicating that the authentication method has been performed; and
- responsive to transmitting the third message, receiving (1180) a fourth message from the second network node, the fourth message including authentication subscription data associated with the communication device; and
- responsive to receiving the fourth message, validating (1190) the authentication subscription data.

Embodiment 7. The method of Embodiment 6, wherein the fourth message further includes a second authentication procedure associated with the authentication subscription data,
- wherein validating the authentication subscription data comprises:
  - determining that third subscriber information associated with the authentication subscription data matches the second subscriber information; and
  - determining that the second authentication procedure matches the authentication procedure.

Embodiment 8. The method of any of Embodiments 5-7, wherein the second network node is a unified data management, UDM, node.

Embodiment 9. The method of any of claims 1-8, wherein the authentication procedure comprises at least one of an extensible authentication protocol, EAP, transport layer security, TLS, and an EAP tunneled transport layer security, TTLS,
- wherein the information comprises at least one of a client certificate and a username, and
- wherein receiving the information associated with the communication device as part of the authentication procedure comprises at least one of:
  - receiving the client certificate via the EAP-TLS; and
  - receiving the username via the EAP-TTLS.

Embodiment 10. A method of operating a second network node in a telecommunications network, the method comprising:
- receiving (1210), from a first network node, an authentication request associated with a communication device requesting registration with the telecommunications network, the authentication request including first subscriber information;
- responsive to receiving the authentication request, determining (1220) that the first subscriber information includes an anonymous identifier;
- responsive to determining that the first subscriber information includes the anonymous identifier, determining (1230) an authentication procedure to be performed; and
- responsive to determining the authentication procedure to be performed, transmitting (1240) an authentication response to the first network node, the authentication response including an indicator indicating the authentication procedure and an indicator indicating that the subscriber information includes the anonymous identifier.

Embodiment 11. The method of Embodiment 10, further comprising:
- responsive to transmitting the authentication response, receiving (1250) a second authentication request associated with the communication device requesting registration with the telecommunications network, the second authentication request including second subscriber information and an indicator indicating the authentication procedure has been performed;
- responsive to receiving the second authentication request, determining (1270) a second authentication procedure associated with the second subscriber information; and
- responsive to determining the second authentication procedure, transmitting (1280) a second authentication response to the first network node, the second authentication response including an indicator indicating the second authentication procedure.

Embodiment 12. The method of Embodiment 11, wherein the first subscriber information comprises a first subscription concealed identifier, SUCI,
- wherein the second subscriber information comprises a second SUCI or a subscription permanent identifier, SUPI.

Embodiment 13. The method of Embodiment 12, wherein the second subscriber information comprises the second SUCI,
- the method further comprising responsive to receiving the second authentication request, determining (1360) the SUPI based on the SUCI using a subscriber identity de-concealing function, SIDF, and
- wherein the second authentication response further includes the SUPI.

Embodiment 14. The method of any of Embodiments 10-13, wherein the second network node is a unified data management, UDM, node,
- wherein the first network node is an authentication server function, AUSF, node, and
- wherein the telecommunications network is a 5th generation, 5G, network.

Embodiment 15. A first network node (700, 800) operating in a telecommunications network, the first network node comprising:
- processing circuitry (703, 803);
- memory (705, 805) coupled to the processing circuitry and having instructions stored therein that are executable by the processing circuitry to cause the first network node to perform operations, the operations comprising:
  - receiving (1010) an authentication request associated with a communication device requesting registration with the telecommunications network, the authentication request including first subscriber information;
determining (1040) that the first subscriber information includes an anonymous identifier;
responsive to determining that the first subscriber information includes the anonymous identifier, determining (1050) an authentication procedure to be performed;
responsive to determining the authentication procedure to be performed, receiving (1060) information associated with the communication device as part of the authentication procedure; and
generating (1070) second subscriber information based on the information associated with the communication device.

Embodiment 16. The first network node of Embodiment 15, wherein the first network node is an authentication server function, AUSF, node, and
wherein the telecommunications network is a 5th generation, 5G, network.

Embodiment 17. The first network node of any of Embodiments 15-16, wherein the first subscriber information comprises a first subscription concealed identifier, SUCI,
wherein the second subscriber information comprises a second SUCI or a subscription permanent identifier, SUPI.

Embodiment 18. The first network node of any of Embodiments 15-17, wherein the authentication request further includes an indicator indicating that the communication device is a non-5G capable, N5GC, device, and
wherein determining that the first subscriber information includes the anonymous identifier comprises determining that the first subscriber information includes the anonymous identifier based on the authentication request including the indicator indicating that the communication device is a N5GC device.

Embodiment 19. The first network node of any of Embodiments 15-18, the operations further comprising:
responsive to receiving the authentication request, transmitting (1020) a first message to a second network node, the first message including the first subscriber information; and
responsive to transmitting the first message to the second network node, receiving (1030) a second message from the second network node, the second message including a first indicator indicating that the first subscriber information includes the anonymous identifier and a second indicator indicating the authentication, and
wherein determining that the first subscriber information includes the anonymous identifier comprises determining that the first subscriber information includes the anonymous identifier based on the first indicator, and
wherein determining the authentication procedure to be performed comprises determining the authentication procedure to be performed based on the second indicator.

Embodiment 20. The first network node of any of Embodiments 15-19, the operations further comprising:
responsive to generating the second subscriber information, transmitting (1175) a third message to a second network node, the third message including the second subscriber information and an indicator indicating that the authentication method has been performed;
responsive to transmitting the third message, receiving (1180) a fourth message from the second network node, the fourth message including authentication subscription data associated with the communication device; and
responsive to receiving the fourth message, validating (1190) the authentication subscription data.

Embodiment 21. The first network node of Embodiment 20, wherein the fourth message further includes a second authentication procedure associated with the authentication subscription data,
wherein validating the authentication subscription data comprises:
determining that third subscriber information associated with the authentication subscription data matches the second subscriber information; and
determining that the second authentication procedure matches the authentication procedure.

Embodiment 22. The first network node of any of Embodiments 19-21, wherein the second network node is a unified data management, UDM, node.

Embodiment 23. The first network node of any of claims 15-22, wherein the authentication procedure comprises at least one of an extensible authentication protocol, EAP, transport layer security, TLS, and an EAP tunneled transport layer security, TTLS,
wherein the information comprises at least one of a client certificate and a username, and
wherein receiving the information associated with the communication device as part of the authentication procedure comprises at least one of:
receiving the client certificate via the EAP-TLS; and
receiving the username via the EAP-TTLS.

Embodiment 24. A first network node (700, 800) operating in a telecommunications network, the first network node adapted to perform operations, the operations comprising:
receiving (1010) an authentication request associated with a communication device requesting registration with the telecommunications network, the authentication request including first subscriber information;
determining (1040) that the first subscriber information includes an anonymous identifier;
responsive to determining that the first subscriber information includes the anonymous identifier, determining (1050) an authentication procedure to be performed;
responsive to determining the authentication procedure to be performed, receiving (1060) information associated with the communication device as part of the authentication procedure; and
generating (1070) second subscriber information based on the information associated with the communication device.

Embodiment 25. The first network node of Embodiment 24, the operations further comprising any operations of Embodiments 2-9.

Embodiment 26. A computer program comprising program code to be executed by processing circuitry (703, 803) of a first network node (700, 800) operating in a telecommunications network, whereby execution of the program code causes the first network node to perform operations, the operations comprising:
receiving (1010) an authentication request associated with a communication device requesting registration with the telecommunications network, the authentication request including first subscriber information;
determining (1040) that the first subscriber information includes an anonymous identifier;

responsive to determining that the first subscriber information includes the anonymous identifier, determining (1050) an authentication procedure to be performed;

responsive to determining the authentication procedure to be performed, receiving (1060) information associated with the communication device as part of the authentication procedure; and generating (1070) second subscriber information based on the information associated with the communication device.

Embodiment 27. The computer program of Embodiment 26, the operations further comprising any operations of Embodiments 2-9.

Embodiment 28. A computer program product comprising a non-transitory storage medium (705, 805) including program code to be executed by processing circuitry (703, 803) of a first network node (700, 800) operating in a telecommunications network, whereby execution of the program code causes the first network node to perform operations, the operations comprising:

receiving (1010) an authentication request associated with a communication device requesting registration with the telecommunications network, the authentication request including first subscriber information;

determining (1040) that the first subscriber information includes an anonymous identifier;

responsive to determining that the first subscriber information includes the anonymous identifier, determining (1050) an authentication procedure to be performed;

responsive to determining the authentication procedure to be performed, receiving (1060) information associated with the communication device as part of the authentication procedure; and generating (1070) second subscriber information based on the information associated with the communication device.

Embodiment 29. The computer program product of Embodiment 26, the operations further comprising any operations of Embodiments 2-9.

Embodiment 30. A second network node (700, 900) operating in a telecommunications network, the second network node comprising:

processing circuitry (703, 903);

memory (705, 905) coupled to the processing circuitry and having instructions stored therein that are executable by the processing circuitry to cause the second network node to perform operations, the operations comprising:

receiving (1210), from a first network node, an authentication request associated with a communication device requesting registration with the telecommunications network, the authentication request including first subscriber information;

responsive to receiving the authentication request, determining (1220) that the first subscriber information includes an anonymous identifier;

responsive to determining that the first subscriber information includes the anonymous identifier, determining (1230) an authentication procedure to be performed;

responsive to determining the authentication procedure to be performed, transmitting (1240) an authentication response to the first network node, the authentication response including an indicator indicating the authentication procedure and an indicator indicating that the subscriber information includes the anonymous identifier.

Embodiment 31. The second network node of Embodiment 30, the operations further comprising:

responsive to transmitting the authentication response, receiving (1250) a second authentication request associated with the communication device requesting registration with the telecommunications network, the second authentication request including second subscriber information and an indicator indicating the authentication procedure has been performed;

responsive to receiving the second authentication request, determining (1270) a second authentication procedure associated with the second subscriber information; and responsive to determining the second authentication procedure, transmitting (1280) a second authentication response to the first network node, the second authentication response including an indicator indicating the second authentication procedure.

Embodiment 32. The second network node of Embodiment 31, wherein the first subscriber information comprises a first subscription concealed identifier, SUCI, wherein the second subscriber information comprises a second SUCI or a subscription permanent identifier, SUPI.

Embodiment 33. The second network node of Embodiment 32, wherein the second subscriber information comprises the second SUCI, the operations further comprising responsive to receiving the second authentication request, determining (1360) the SUPI based on the SUCI using a subscriber identity de-concealing function, SIDF, and wherein the second authentication response further includes the SUPI.

Embodiment 34. The second network node of any of Embodiments 30-33, wherein the second network node is a unified data management, UDM, node, wherein the first network node is an authentication server function, AUSF, node, and wherein the telecommunications network is a 5th generation, 5G, network.

Embodiment 35. A second network node (700, 900) operating in a telecommunications network, the second network node adapted to perform operations, the operations comprising:

receiving (1210), from a first network node, an authentication request associated with a communication device requesting registration with the telecommunications network, the authentication request including first subscriber information;

responsive to receiving the authentication request, determining (1220) that the first subscriber information includes an anonymous identifier;

responsive to determining that the first subscriber information includes the anonymous identifier, determining (1230) an authentication procedure to be performed;

responsive to determining the authentication procedure to be performed, transmitting (1240) an authentication response to the first network node, the authentication response including an indicator indicating the authentication procedure and an indicator indicating that the subscriber information includes the anonymous identifier.

Embodiment 36. The second network node of Embodiment 33, the operations further comprising any operations of Embodiments 11-14.

Embodiment 37. A computer program comprising program code to be executed by processing circuitry (703, 903) of a second network node (700, 900) operating in a telecommunications network, whereby execution of the program code causes the second network node to perform operations, the operations comprising:

receiving (1210), from a first network node, an authentication request associated with a communication device requesting registration with the telecommunications network, the authentication request including first subscriber information;

responsive to receiving the authentication request, determining (1220) that the first subscriber information includes an anonymous identifier;

responsive to determining that the first subscriber information includes the anonymous identifier, determining (1230) an authentication procedure to be performed;

responsive to determining the authentication procedure to be performed, transmitting (1240) an authentication response to the first network node, the authentication response including an indicator indicating the authentication procedure and an indicator indicating that the subscriber information includes the anonymous identifier.

Embodiment 38. The computer program of Embodiment 37, the operations further comprising any operations of Embodiments 11-14.

Embodiment 39. A computer program product comprising a non-transitory storage medium (705, 905) including program code to be executed by processing circuitry (703, 903) of a second network node (700, 900) operating in a telecommunications network, whereby execution of the program code causes the second network node to perform operations, the operations comprising:

receiving (1210), from a first network node, an authentication request associated with a communication device requesting registration with the telecommunications network, the authentication request including first subscriber information;

responsive to receiving the authentication request, determining (1220) that the first subscriber information includes an anonymous identifier;

responsive to determining that the first subscriber information includes the anonymous identifier, determining (1230) an authentication procedure to be performed;

responsive to determining the authentication procedure to be performed, transmitting (1240) an authentication response to the first network node, the authentication response including an indicator indicating the authentication procedure and an indicator indicating that the subscriber information includes the anonymous identifier.

Embodiment 40. The computer program product of Embodiment 39, the operations further comprising any operations of Embodiments 11-14.

Additional References are included below.

"Security Architecture and Procedures for 5G Systems," 3GPP 33.501 16.2.0.

"The EAP-TLS Authentication Protocol," IETF RFC 5216.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
    3GPP 3rd Generation Partnership Project
    5G 5th Generation
    ABS Almost Blank Subframe
    ARQ Automatic Repeat Request
    AWGN Additive White Gaussian Noise
    BCCH Broadcast Control Channel
    BCH Broadcast Channel
    CA Carrier Aggregation
    CC Carrier Component
    CCCH SDU Common Control Channel SDU
    CDMA Code Division Multiplexing Access
    CGI Cell Global Identifier
    CIR Channel Impulse Response
    CP Cyclic Prefix
    CPICH Common Pilot Channel
    CPICH Ec/No CPICH Received energy per chip divided by the power density in the band
    CQI Channel Quality information
    C-RNTI Cell RNTI
    CSI Channel State Information
    DCCH Dedicated Control Channel
    DL Downlink
    DM Demodulation
    DMRS Demodulation Reference Signal DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first network node in a telecommunications network, wherein the first network node is an Authentication Server Function (AUSF) node and wherein the telecommunications network is a 5th generation, 5G, telecommunications network, the method comprising:
   receiving an authentication request associated with a communication device requesting registration with the telecommunications network, the authentication request including first subscriber information;
   determining that the first subscriber information comprises an anonymous Subscription Concealed Identifier (SUCI) containing an anonymous identifier; and
   generating second subscriber information based on the first subscriber information.

2. The method of claim 1, further comprising:
   responsive to receiving the authentication request, transmitting a first message to a second network node, the first message including the first subscriber information; and
   responsive to transmitting the first message to the second network node, receiving a second message from the second network node, the second message including a first indicator indicating that the first subscriber information includes the anonymous identifier and a second indicator indicating the authentication procedure, and
   wherein determining that the first subscriber information includes the anonymous identifier comprises determining that the first subscriber information includes the anonymous identifier based on the first indicator.

3. The method of claim 1, wherein the first subscriber information comprises a first subscription concealed identifier, SUCI,
   wherein the second subscriber information comprises a second SUCI or a subscription permanent identifier, SUPI.

4. The method of claim 1, wherein the authentication request further includes an indicator indicating that the communication device is a non-5G capable, N5GC, device, and
wherein determining that the first subscriber information includes the anonymous identifier comprises determining that the first subscriber information includes the anonymous identifier based on the authentication request including the indicator indicating that the communication device is a N5GC device.

5. The method of claim 1, further comprising:
responsive to generating the second subscriber information, transmitting a third message to a second network node, the third message including the second subscriber information and an indicator indicating that the authentication method has been performed; and
responsive to transmitting the third message, receiving a fourth message from the second network node, the fourth message including authentication subscription data associated with the communication device; and
responsive to receiving the fourth message, validating the authentication subscription data.

6. The method of claim 5, wherein the fourth message further includes a second authentication procedure associated with the authentication subscription data,
wherein validating the authentication subscription data comprises:
determining that third subscriber information associated with the authentication subscription data matches the second subscriber information; and
determining that the second authentication procedure matches the authentication procedure.

7. The method of claim 1, wherein the second network node is a unified data management, UDM, node.

8. The method of claim 1, further comprising:
responsive to determining that the first subscriber information includes the anonymous identifier, determining an authentication procedure to be performed;
responsive to determining the authentication procedure to be performed, receiving information associated with the communication device as part of the authentication procedure; and
wherein generating the second subscriber information comprises generating the second subscriber information based on the information associated with the communication device.

9. The method of claim 8, wherein determining the authentication procedure to be performed comprises determining the authentication procedure to be performed based on a second indicator.

10. The method of claim 8, wherein the authentication procedure comprises at least one of an extensible authentication protocol, EAP, transport layer security, TLS, and an EAP tunneled transport layer security, TTLS,
wherein the information comprises at least one of a client certificate and a username, and
wherein receiving the information associated with the communication device as part of the authentication procedure comprises at least one of:
receiving the client certificate via the EAP-TLS; and
receiving the username via the EAP-TTLS.

11. A method of operating a second network node in a telecommunications network, wherein the second network node comprises a unified data management, UDM, node and wherein the telecommunications network is a 5th generation, 5G, telecommunications network, the method comprising:
receiving, from a first network node comprising an Authentication Server Function (AUSF), an authentication request associated with a communication device requesting registration with the telecommunications network, the authentication request including first subscriber information;
responsive to receiving the authentication request, determining that the first subscriber information comprises an anonymous subscription concealed identifier (SUCI) containing an anonymous identifier;
responsive to determining that the first subscriber information includes the anonymous identifier, determining an authentication procedure to be performed; and
responsive to determining the authentication procedure to be performed, transmitting an authentication response to the first network node, the authentication response including an indicator indicating the authentication procedure and an indicator indicating that the subscriber information includes the anonymous identifier.

12. The method of claim 11, further comprising:
responsive to transmitting the authentication response, receiving a second authentication request associated with the communication device requesting registration with the telecommunications network, the second authentication request including second subscriber information and an indicator indicating the authentication procedure has been performed;
responsive to receiving the second authentication request, determining a second authentication procedure associated with the second subscriber information; and
responsive to determining the second authentication procedure, transmitting a second authentication response to the first network node, the second authentication response including an indicator indicating the second authentication procedure.

13. The method of claim 12, wherein the first subscriber information comprises a first subscription concealed identifier, SUCI,
wherein the second subscriber information comprises a second SUCI or a subscription permanent identifier, SUPI.

14. The method of claim 13, wherein the second subscriber information comprises the second SUCI,
the method further comprising responsive to receiving the second authentication request, determining the SUPI based on the SUCI using a subscriber identity de-concealing function, SIDF, and
wherein the second authentication response further includes the SUPI.

15. A first network node, comprising:
processing circuitry and memory collectively configured to:
receive an authentication request associated with a communication device requesting registration with the telecommunications network, the authentication request including first subscriber information;
determine that the first subscriber information comprises an anonymous Subscription Concealed Identifier (SUCI) containing an anonymous identifier; and
generate second subscriber information based on the first subscriber information.

16. The first network node of claim 15, wherein the processing circuitry and memory are further collectively configured to:

responsive to receiving the authentication request, transmitting a first message to a second network node, the first message including the first subscriber information; and responsive to transmitting the first message to the second network node, receiving a second message from the second network node, the second message including a first indicator indicating that the first subscriber information includes the anonymous identifier and a second indicator indicating the authentication procedure, and wherein determining that the first subscriber information includes the anonymous identifier comprises determining that the first subscriber information includes the anonymous identifier based on the first indicator.

17. The first network node of claim 15, wherein the first subscriber information comprises a first subscription concealed identifier, SUCI, wherein the second subscriber information comprises a second SUCI or a subscription permanent identifier, SUPI.

18. The first network node of claim 15, wherein the authentication request further includes an indicator indicating that the communication device is a non-5G capable, N5GC, device, and wherein determining that the first subscriber information includes the anonymous identifier comprises determining that the first subscriber information includes the anonymous identifier based on the authentication request including the indicator indicating that the communication device is a N5GC device.

19. The first network node of claim 15, wherein the processing circuitry and memory are further collectively configured to:

responsive to generating the second subscriber information, transmit a third message to a second network node, the third message including the second subscriber information and an indicator indicating that the authentication method has been performed; and responsive to transmitting the third message, receive a fourth message from the second network node, the fourth message including authentication subscription data associated with the communication device; and responsive to receiving the fourth message, validate the authentication subscription data.

20. The first network node of claim 19, wherein the fourth message further includes a second authentication procedure associated with the authentication subscription data, wherein validating the authentication subscription data comprises:

determining that third subscriber information associated with the authentication subscription data matches the second subscriber information; and determining that the second authentication procedure matches the authentication procedure.

21. The first network node of claim 15, wherein the second network node is a unified data management, UDM, node.

22. The first network node of claim 15, wherein the processing circuitry and memory are further collectively configured to:

responsive to determining that the first subscriber information includes the anonymous identifier, determine an authentication procedure to be performed;

responsive to determining the authentication procedure to be performed, receive information associated with the communication device as part of the authentication procedure; and wherein generating the second subscriber information comprises generating the second subscriber information based on the information associated with the communication device.

23. The first network node of claim 22, wherein determining the authentication procedure to be performed comprises determining the authentication procedure to be performed based on a second indicator.

24. The first network node of claim 22, wherein the authentication procedure comprises at least one of an extensible authentication protocol, EAP, transport layer security, TLS, and an EAP tunneled transport layer security, TTLS, wherein the information comprises at least one of a client certificate and a username, and wherein receiving the information associated with the communication device as part of the authentication procedure comprises at least one of:

receiving the client certificate via the EAP-TLS; and receiving the username via the EAP-TTLS.

25. A second network node, comprising:

processing circuitry and memory collectively configured to:

receive, from a first network node, an authentication request associated with a communication device requesting registration with the telecommunications network, the authentication request including first subscriber information;

responsive to receiving the authentication request, determine that the first subscriber information comprises an anonymous subscription concealed identifier (SUCI) containing an anonymous identifier;

responsive to determining that the first subscriber information includes the anonymous identifier, determine an authentication procedure to be performed; and responsive to determining the authentication procedure to be performed, transmit an authentication response to the first network node, the authentication response including an indicator indicating the authentication procedure and an indicator indicating that the subscriber information includes the anonymous identifier.

26. The second network node of claim 25, wherein the processing circuitry and memory are further configured to:

responsive to transmitting the authentication response, receive a second authentication request associated with the communication device requesting registration with the telecommunications network, the second authentication request including second subscriber information and an indicator indicating the authentication procedure has been performed;

responsive to receiving the second authentication request, determine a second authentication procedure associated with the second subscriber information; and responsive to determining the second authentication procedure, transmit a second authentication response to the first network node, the second authentication response including an indicator indicating the second authentication procedure.

27. The second network node of claim 26, wherein the first subscriber information comprises a first subscription concealed identifier, SUCI, wherein the second subscriber information comprises a second SUCI or a subscription permanent identifier, SUPI.

28. The second network node of claim 27, wherein the second subscriber information comprises the second SUCI, wherein the processing circuitry and memory are further collectively configured to, responsive to receiving the second authentication request, determine the SUPI based on the SUCI using a subscriber identity de-concealing function, SIDF, and wherein the second authentication response further includes the SUPI.

* * * * *

UNITED STATES PATENT AND TRADEMARK OFFICE
CERTIFICATE OF CORRECTION

| | | |
|---|---|---|
| PATENT NO. | : 12,245,022 B2 | Page 1 of 2 |
| APPLICATION NO. | : 17/627795 | |
| DATED | : March 4, 2025 | |
| INVENTOR(S) | : Wang et al. | |

It is certified that error appears in the above-identified patent and that said Letters Patent is hereby corrected as shown below:

On the Title Page

On Page 2, in Item (56), under "OTHER PUBLICATIONS", in Column 1, Line 8, delete "3G{{" and insert -- 3GPP --, therefor.

In the Specification

In Column 1, Line 10, delete "disclosure disclosures" and insert -- disclosures --, therefor.

In Column 2, Lines 28-29, delete "when and anonymous" and insert -- when an anonymous --, therefor.

In Column 2, Line 57, delete "("ON")" and insert -- ("CN") --, therefor.

In Column 3, Line 44, delete "name)" and insert -- name)) --, therefor.

In Column 4, Line 36, delete "SUPI)" and insert -- SUPI)) --, therefor.

In Column 4, Line 38, delete "ABBA)" and insert -- ABBA)) --, therefor.

In Column 8, Line 23, delete "NSGC." and insert -- N5GC. --, therefor.

In Column 8, Line 23, delete "NSGC," and insert -- N5GC, --, therefor.

In Column 10, Line 6, delete "NSGC" and insert -- N5GC --, therefor.

In Column 13, Line 51, delete "claims 1-8," and insert -- Embodiments 1-8, --, therefor.

In Column 16, Lines 21-22, delete "claims 15-22," and insert -- Embodiments 15-22, --, therefor.

Signed and Sealed this
Fourteenth Day of October, 2025

John A. Squires
*Director of the United States Patent and Trademark Office*

In Column 20, Line 28, delete "according one" and insert -- according to one --, therefor.

In Column 20, Line 52, delete "Carrier Component" and insert -- Component Carrier --, therefor.

In Column 20, Line 54, delete "CDMACode Division Multiplexing Access" and insert -- CDMA Code-Division Multiple Access --, therefor.

In Column 20, Line 55, delete "Cell Global Identifier" and insert -- Cell Global Identity --, therefor.

In Column 21, Line 6, delete "E-SMLC Evolved-Serving Mobile Location Centre".

In Column 21, Line 49, delete "Profile Delay Profile" and insert -- Power Delay Profile --, therefor.

In Column 21, Line 54, delete "Precoder Matrix Indicator" and insert -- Precoding Matrix Indicator --, therefor.

In Column 21, Line 64, delete "Radio Link Management" and insert -- Radio Link Monitoring --, therefor.

In Column 22, Line 19, delete "Self Optimized Network" and insert -- Self-Organizing Network --, therefor.

In Column 22, Line 34, delete "Wide CDMA" and insert -- Wideband CDMA --, therefor.

In Column 22, Line 35, delete "Wide Local Area Network" and insert -- Wireless Local-Area Network --, therefor.